(12) United States Patent
Devillez

(10) Patent No.: US 11,878,804 B2
(45) Date of Patent: Jan. 23, 2024

(54) EMERGENCY OPENING DEVICE OF AN AIRCRAFT DOOR HAVING A RETENTION WIRE

(71) Applicant: LATECOERE, Toulouse Occitaine (FR)

(72) Inventor: Sabastien Devillez, Saint Jean (FR)

(73) Assignee: LATECOERE, Toulouse (FR)

( * ) Notice: Subject to any disclaimer, the term of this patent is extended or adjusted under 35 U.S.C. 154(b) by 196 days.

(21) Appl. No.: 17/625,120

(22) PCT Filed: Jul. 6, 2020

(86) PCT No.: PCT/EP2020/069041
§ 371 (c)(1),
(2) Date: Jan. 6, 2022

(87) PCT Pub. No.: WO2021/005021
PCT Pub. Date: Jan. 14, 2021

(65) Prior Publication Data
US 2022/0268071 A1    Aug. 25, 2022

(30) Foreign Application Priority Data
Jul. 8, 2019  (FR) ...................................... 1907576

(51) Int. Cl.
*B64D 25/08*    (2006.01)
*B64C 1/14*     (2006.01)
*E05F 1/10*     (2006.01)

(52) U.S. Cl.
CPC ............ *B64D 25/08* (2013.01); *B64C 1/1407* (2013.01); *E05F 1/105* (2013.01); *E05Y 2800/252* (2013.01); *E05Y 2900/502* (2013.01)

(58) Field of Classification Search
CPC ......... B64D 25/08; B64C 1/1407; B64C 1/14; B64C 1/1423; B64C 1/143; B64C 1/1438; B64C 1/1461; E05Y 2800/252; E05Y 2800/25; E05Y 2900/502; E05B 65/1033; B60J 9/02; Y10S 292/65; E05F 1/105; E05F 1/006
See application file for complete search history.

(56) References Cited

U.S. PATENT DOCUMENTS 3,454,245 A * 7/1969 Hannagan ............... B64D 25/14
                                                    244/119
4,552,326 A * 11/1985 Bokalot ................ B64C 1/1407
                                                    49/276
(Continued)

FOREIGN PATENT DOCUMENTS

| FR | 2830564 | 4/2003 |
| FR | 2864021 | 6/2005 |
| FR | 2975967 | 12/2012 |

*Primary Examiner* — Justin B Rephann
(74) *Attorney, Agent, or Firm* — Defillo & Associates, Inc; Evelyn A. Defillo

(57) ABSTRACT

An emergency opening device of an aircraft door including a tubular actuating member (2); a resilient compression device; a retaining member for retaining the tubular actuating member (2), having a retaining wire (12) which, when the tubular actuating member (2) is in the retracted position, is held taut between a first attachment (14, 17) and a second attachment (16, 18); a release device which includes a cutting member (22) for transversely cutting the retaining wire (12).

15 Claims, 1 Drawing Sheet

(56) References Cited

U.S. PATENT DOCUMENTS

| | | | | | |
|---|---|---|---|---|---|
| 4,813,634 | A | * | 3/1989 | Zuck | B64D 25/08 244/89 |
| 4,978,089 | A | * | 12/1990 | Alquier | B64C 1/32 49/141 |
| 7,168,659 | B2 | * | 1/2007 | Galvani | B64C 1/1407 244/129.5 |
| 2003/0089827 | A1 | * | 5/2003 | Baderspach | F15B 1/022 244/137.2 |
| 2006/0266887 | A1 | * | 11/2006 | Holder | G05D 7/014 244/129.5 |
| 2023/0272654 | A1 | * | 8/2023 | Devillez | B64C 1/1407 49/324 |

* cited by examiner

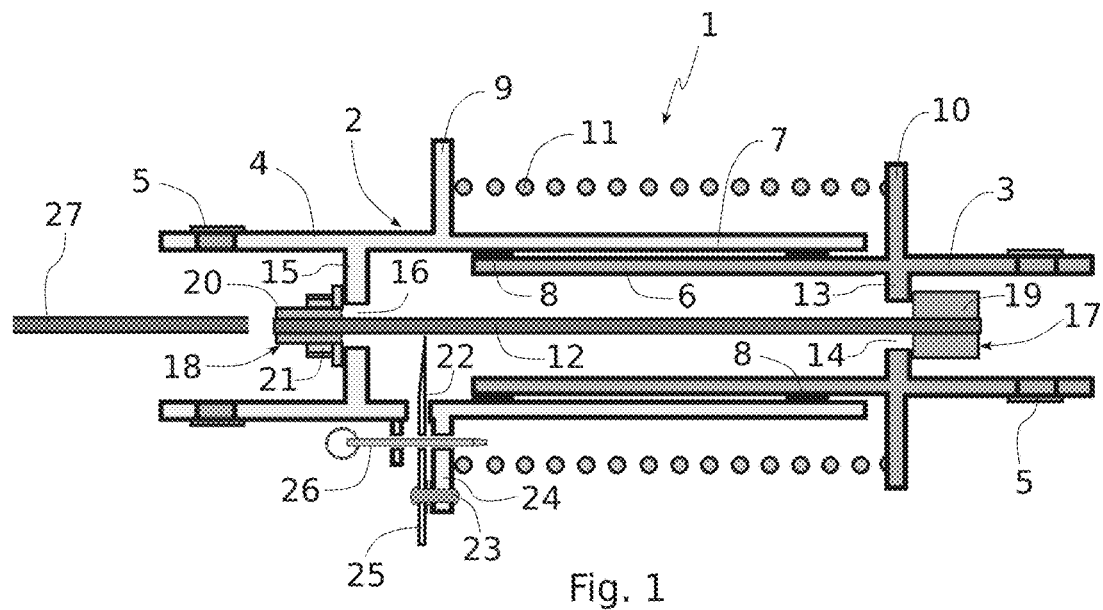
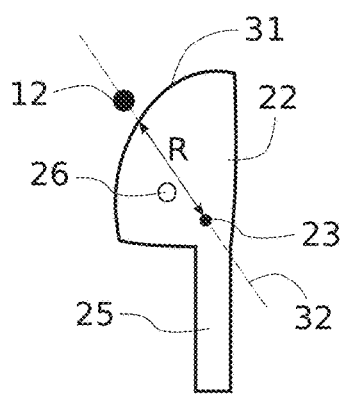
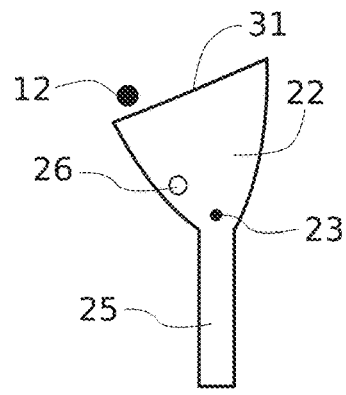
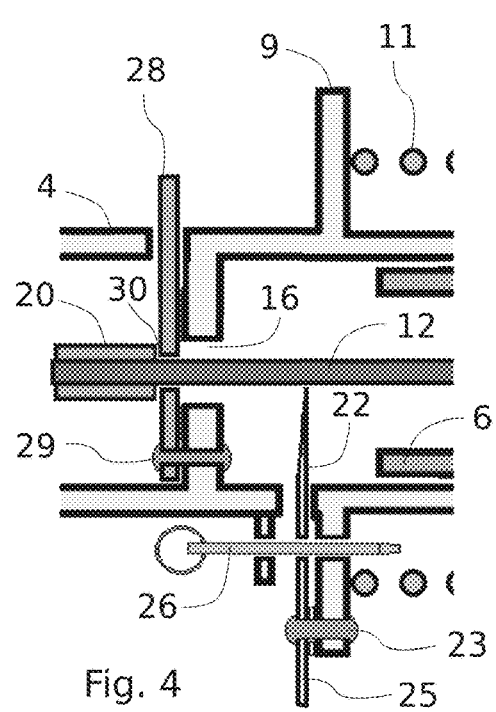

EMERGENCY OPENING DEVICE OF AN AIRCRAFT DOOR HAVING A RETENTION WIRE

CROSS REFERENCE TO RELATED APPLICATION

This application is a national stage entry of PCT/EP2020/069041 filed Jul. 6, 2020, under the International Convention and claiming priority over French Patent Application No. FR1907576 filed Jul. 8, 2019.

TECHNICAL FIELD

The invention relates to the field of aeronautics and relates more particularly to an emergency opening device for an aircraft door.

Aircraft doors can be opened to allow access to the cabin or to the holds, or to allow evacuation in an emergency. In the event of an emergency evacuation of passengers, the aircraft doors, whether these are passenger doors or emergency evacuation doors, usually have an emergency opening device which, if activated, causes the doors to open rapidly and effortlessly, without the need for human intervention other than for triggering it. It is imperative that the triggering of the emergency opening device requires only very little effort.

PRIOR ART

Currently, as is described in particular in patent applications FR2830564 and EP071073, the actuating means conventionally consist of an actuator of pneumatic type powered by means of an ancillary reserve of driving fluid. Such actuating means do, however, have multiple drawbacks. Specifically, and in the first place, they are relatively weighty and relatively bulky, in particular because of the presence of the ancillary reserve of driving fluid. In addition, they necessitate periodic checks on the pressure of the driving fluid, and require periodic replacement of the ancillary reserve even if it has not been used. Lastly, following activation of the emergency opening device, these actuating means, in order to be returned to an operational status, necessitate replacement of the ancillary reserve of driving fluid.

Another current solution described in particular in patent application FR2864021 allows the bulkiness and the weight of the actuating means to be reduced. Specifically, according to this solution, the actuating means consist of a pyrotechnic ram, that is to say an autonomous ram that does not need to be supplied from a source of driving fluid. On the other hand, such pyrotechnic rams have to be periodically inspected and replaced even if not used. Moreover, these pyrotechnic rams also have to be replaced after the emergency opening device has been activated.

Patent application FR2975967 describes an aircraft emergency opening device which overcomes the abovementioned drawbacks. This emergency opening device consists of actuating means of mechanical design making it possible to dispense with pneumatic or pyrotechnic elements. The weight and the bulkiness of the emergency opening device are thus reduced, the reliability is increased, and this device requires little or no maintenance. However, the emergency opening device described requires activation means having an electromagnet. This emergency opening device is therefore not entirely mechanical since it uses an electromechanical element which requires an external source of electrical energy, and also a control device suitable for connecting the electromagnet to this external source of electrical energy. This door opening device therefore requires, in addition to this external source of electrical energy, power-supply and control wiring which can be an additional source of complexity and malfunctioning. The reason why an electromagnet is needed in this emergency opening device is that the retaining member applies a significant force to an operating member, such that the transition of the retaining member into the open position in order to release the operating member for emergency opening requires this force to be overcome. The emergency opening device has a reset portion and jaws that allow a very significant retaining force to be obtained, which means that elastic means with appreciable preloading can be used. In this configuration, the creation of a retaining member that is purely mechanical and can be activated by an individual would require an excessively long lever arm that is incompatible with the objectives of compactness of the emergency opening device.

DISCLOSURE OF THE INVENTION

The object of the invention is to improve the emergency opening devices of the prior art by providing such a device the operation and control of which are entirely mechanical and the triggering of which requires only very little effort on the part of the user.

To this end, the invention concerns an emergency opening device comprising:
- a tubular actuating member provided with a first connecting end and a second connecting end, this tubular actuating member being able to switch between a retracted rest position and a deployed open position;
- elastic compression means designed to urge the tubular actuating member from its retracted position toward its deployed position;
- a member for retaining the tubular actuating member in its retracted position with the elastic compression means kept compressed;
- triggering means designed to release the retaining member and cause the tubular actuating member to transition into its deployed position under the effect of the expansion of the elastic compression means.

In this emergency opening device:
- the retaining member has a retaining cord which, when the tubular actuating member is in the retracted position, is held taut between a first fastener at the first connecting end and a second fastener at the second connecting end of the tubular actuating member;
- the triggering means have a member for transversely severing the retaining cord.

Such an emergency opening device has all the advantages of a mechanical device as described in document FR2975967. These actuating means have reduced bulkiness and weight. The mechanical design of the actuating means does not require any particular maintenance when the opening device is not used. No driving fluid is necessary to activate the actuating means.

The device according to the invention is, in addition, entirely mechanical and does not require any connection to an external source of energy or to a remote control means. Such a device forms an end product of the entirely autonomous mechanical ram type, which is a hallmark of operational safety and reliability, which are highly sought after in the field of aeronautics and more particularly of emergency opening devices.

Even though the device according to the invention is entirely mechanical and autonomous, it may have highly preloaded elastic means, that is to say means intended to apply a significant opening force to the door opening mechanism, something which is needed in this emergency door-opening application. Despite the high preloading of the elastic elements, the actuating means can be activated effortlessly. The retaining cord allows a significant disparity between the force for maintaining the preloading of the elastic means, and the force necessary to trigger the device. Even with heavily preloaded elastic means, which implies the cord is heavily tensioned, transversely severing it will require minimum force. The ratio of retaining force to triggering force is very favourable and the invention makes it possible to increase the preloading of the elastic means while still reducing the triggering force.

In the emergency opening device according to the invention, the retention of the actuating member does not rely on any movable mechanism the parts of which would require complex means in order to remain movable under load (rolling bearings, rings, etc.) and would be subject to wear by friction, plastic deformation, and other disadvantages relating to movable mechanical parts held under heavy loading.

The invention allows the emergency opening devices of the prior art to be greatly simplified by eliminating numerous mechanical parts, thereby making the device lighter, more compact and more reliable, in addition to lowering its cost.

The emergency opening device according to the invention may have the following additional features, taken alone or in combination:
  the first connecting end has a first bottom wall on which the first fastener is arranged, and the second connecting end has a second bottom wall on which the second fastener is arranged;
  the first fastener has a first retaining orifice, made in the first bottom wall, in which is fitted a first end of the retaining cord, and the second fastener has a second retaining orifice, made in the second bottom wall, in which is fitted a second end of the retaining cord;
  the first fastener comprises, at the first end of the retaining cord, a first part for locking the retaining cord in relation to the first retaining orifice, and the second fastener comprises, at the second end of the retaining cord, a second part for locking the retaining cord in relation to the second retaining orifice;
  the first locking part has a first insert fastened to the retaining cord, and the second locking part has a second insert fastened to the retaining cord;
  in the device: the first insert has a radial dimension greater than the radial dimension of the second insert; the first retaining orifice has a diameter greater than the radial dimension of the second insert and less than the radial dimension of the first insert; the second retaining orifice has a diameter greater than the radial dimension of the second insert; the second locking part has a fastener for locking the second insert in order to lock the second insert in relation to the second retaining orifice;
  the locking fastener is a rotatable flange having a groove for locking the second insert;
  the retaining cord may be made up of a bundle of carbon fibers or aramid fibers, for example;
  the transverse-severing member comprises a triggering knife extending in a cutting plane substantially perpendicular to the retaining cord, the triggering knife being mounted so as to be able to pivot on the actuating member, about a pivot perpendicular to the cutting plane;
  the transverse-severing member has a control lever projecting from the actuating member and designed to drive the transverse-severing member against the retaining cord by pivoting about the pivot;
  the triggering knife has a sharp edge oriented to come into contact with the retaining cord by way of a normal component and a tangential component;
  the actuating member comprises coaxial cylinders that are nested in a slide connection, the elastic compression means extending between two collars, each of which is integral with a cylinder;
  the retaining cord has a constant diameter.

Another subject of the invention concerns an aircraft door having an emergency opening device as described above and the first connecting end of which is in pivot connection with a movable element of the door, and the second connecting end of which is in pivot connection with another movable element of the door, an action of moving said movable elements away from one another causing the door to open.

Another subject of the invention concerns a method for resetting an emergency opening device as described above, said method having the following steps:
  inserting the retaining cord, provided with an additional length projecting from its second end, into the actuating member by inserting the second insert through the first retaining orifice and then through the second retaining orifice, until the first insert locks the first end of the retaining cord in relation to the first retaining orifice;
  placing the fastener for locking the second insert so as to lock the second end of the retaining cord in relation to the second retaining orifice;
  removing the additional length of the retaining cord.

DESCRIPTION OF THE FIGURES

Other features and advantages of the invention will emerge from the nonlimiting description which follows, with reference to the appended drawings in which:

FIG. 1 shows a sectional view of an emergency opening device according to the invention;

FIG. 2 is a front view of the means for triggering the device of FIG. 1;

FIG. 3 is a variant of the triggering means of FIG. 2;

FIG. 4 is a partial view illustrating a variant of the device of FIG. 1.

DETAILED DESCRIPTION OF THE INVENTION

FIG. 1 shows an emergency opening device 1 for an aircraft door, according to the invention.

The device 1 has a tubular actuating member 2 provided with a first connecting end 3 and a second connecting end 4. These connecting ends have interface parts 5, which make it possible to connect said connecting ends to the elements of the aircraft door that the device 1 is intended to open in an emergency. In the present example, the interface parts 5 are pivots which allow the connecting ends 3, 4 to apply a force to the parts on which they act while still allowing useful rotation during the opening movements.

The connection with the aircraft door may be effected in various ways that have in common the ability to open the door rapidly, in an emergency situation, by deployment of the actuating member 2. The aircraft door in the broad sense includes the door leaf, the door opening mechanism, or the structure that frames the door, is connected to the fuselage and forms the door surround. Thus, the first connecting end 3 of the actuating member 2 is connected to one element of the door (leaf, opening mechanism, or framing structure) and the second connecting end 4 is connected to another element of the door (leaf, opening mechanism, or framing structure), such that the expansion of the actuating member 2 actuates the door opening mechanism and effectively opens the door. For example, the first connecting end of the actuating member may be fastened to the door opening mechanism, and the second connecting end may be fastened to the door leaf. According to another example, the first connecting end of the actuating member may be fastened to the door leaf, and the second connecting end may be fastened to the door framing structure.

The actuating member 2 preferably comprises multiple coaxial cylinders that are nested in a slide connection. In the present example, the actuating member 2 is made up of an internal tube 6 and an external tube 7. The internal tube 6 is nested so as to be able to slide on the external tube 7 such that the actuating member 2 can be moved between a retracted rest position (shown in FIG. 1) and a deployed open position, in which the internal tube 6 and external tube 7 have slid away from each other as much as possible. The actuating member 2 has sliding rings 8 for the mutual and coaxial sliding of the internal tube 6 and the external tube 7.

Elastic compression means are in this instance formed by a helical spring 11 that is coaxial with the actuating member 2 and mounted between a collar 9 integral with the external tube 7, and a collar 10 integral with the internal tube 6. In the retracted position illustrated in FIG. 1, the spring 11 is compressed as much as possible.

In addition, a retaining member is provided to keep the actuating member 2 in its retracted position, in which the spring 11 is kept compressed. These retaining means comprise a retaining cord 12 which, when the actuating member 2 is in its retracted position, is taut between the first connecting end 3 and the second connecting end 4.

The internal tube 6 has, at the first connecting end 3, a bottom wall 13 in which a first retaining orifice 14 has been made. The external tube 7 comprises, at the second connecting end 4, a bottom wall 15 in which a second retaining orifice 16 has been made.

The retaining cord 12 is taut between a first fastener, in this instance made up of the first retaining orifice 14 and a first locking part 17, and a second fastener, in this instance made up of the second retaining orifice 16 and a second locking part 18.

The first locking part 17 may be formed by any means that allow the retaining cord 12 to be locked at the entrance of the first retaining orifice 14. In the present example, the first locking part 17 is made up of a first insert 19 fastened to the retaining cord 12. This first insert 19 may for example be a crimped metallic insert or a composite-material insert attached to the retaining cord 12 by adhesive bonding, or by other processes specific to the composite materials. As a variant, the retaining cord 12 may be thickened in the area of the first locking part 17, in particular if it is made up of multiple strands. According to another variant, a knot may constitute the first locking part 17.

The retaining cord 12 is made up of any filamentary element, or group of filamentary elements, suitable for being loaded in tension so as to retain the actuating member 2 in the retracted position. The retaining cord 12 may be formed by one or more braided or non-braided strands of metallic or textile or else composite-material cord, or of non-textile fiber. Preferably, the retaining cord 12 is designed, in terms of its structure just as in terms of the choice of its material, to exhibit high tensile strength while still exhibiting low resistance to a transverse slicing operation. Preferably, the retaining cord exhibits high tensile strength while still being susceptible to a transverse slicing force, this being the case for example with some ropes. In a particularly advantageous embodiment, the retaining cord 12 is made up of a bundle of carbon fibers or aramid fibers, which have the advantage of exhibiting very high tensile strength values while still exhibiting low resistance to transverse slicing. The spring 11 may be provided with a very strong preload, capable of rapidly setting in motion, during an emergency opening operation, a bulky aircraft door (such as the door of a long-haul aircraft, which doors are increasingly complex and increasingly heavy, in addition to their appreciable size), while still maintaining or even reducing the force required to trigger the emergency opening device.

The second locking part 18 is for its part made up of a second insert 20 which may be of the same type as the first insert 19. However, the contour of the second insert 20 is threaded, with a nut 21 being screwed onto this insert 20 so as to lock this portion of the retaining cord 12 at the entrance of the second retaining orifice 16. The nut 21 constitutes a locking fastener on the second insert 20 which may also be realized by any part that can be removably mounted on the second insert 20.

The first insert 19 has a radial dimension greater than the radial dimension of the second insert 20. In the present example, the inserts 19, 20 are cylindrical and this radial dimension therefore corresponds to their diameter. In addition, the first retaining orifice 14 has a diameter greater than the radial dimension of the second insert 20 and less than the radial dimension of the first insert 19. The second retaining orifice 16 has a diameter greater than the radial dimension of the second insert 20.

The emergency opening device 1 also has triggering means designed to release the retaining member and cause the actuating member 2 to transition from its retracted position into its deployed position under the effect of the expansion of the spring 11. In this instance, these triggering means have a triggering knife 22 mounted so as to be able to turn about a pivot 23 of a yoke 24 integral with the external tube 7. The triggering knife 22 thus extends in a cutting plane perpendicular to the retaining cord 12, the pivot 23 being perpendicular to the cutting plane.

FIG. 2 is a front view of the triggering knife 22. The triggering knife 22 has a control lever 25 for actuating the rotation of said triggering knife about the pivot 23. In the example of FIG. 2, the sharp edge 31 of the triggering knife 22 has, near the retaining cord 12, a contour in the shape of a portion of a spiral for bringing it closer to the retaining cord 12 by rotating, such that the actuation of the control lever 25 causes the retaining cord 12 to be effortlessly sliced by the triggering knife 22. For example, the triggering knife 22 may have a curved sharp edge 31 with a radius of curvature greater than the radius R defined between the pivot 23 and the sharp cord 31 in a direction 32 passing through the pivot 23 and through the retaining cord 12.

However, the edge 31 does not have to be curved; it may be rectilinear, or have another shape, and exhibit an oblique angle of incidence with respect to the retaining cord 12 such that the pivoting of the knife 22 about the pivot 23 causes the sharp edge 31 to make contact with the retaining cord 12 by way of a normal component and a tangential component that is optimized to reduce the force required to cut the retaining cord 12. FIG. 3 illustrates a rectilinear variant of the sharp edge 31. Whatever shape is chosen for the sharp edge 31, the latter is thus preferably configured to come into contact with the retaining cord 12 with a force exhibiting a normal component, providing the cutting force, and also a tangential component, providing a tangential slicing movement.

In addition, the triggering means have a safety pin 26 for preventing any accidental action on the triggering knife 22.

When a user wishes to bring about the emergency opening of the aircraft door, he removes the pin 26 and actuates the control lever 25, which causes the retaining cord 12 to be transversely severed with a low force. Since the actuating member 2 is no longer held in its retracted position, the spring 11 drives the actuating member 2 toward its deployed position, causing the first end 3 and the second end 4 to be moved apart from one another, which brings about the emergency opening of the aircraft door.

The cross section of the retaining cord 12 is dimensioned, depending on its material, to withstand the tensile force of the spring 11. Since the retaining cord 12 is intended to be severed by slicing, no breakable or frangible portion is necessary, the retaining cord 12 preferably having a constant diameter.

During the manufacture of the device 1, or when it is being reset after being triggered, the device 1 is first of all without a retaining cord 12.

A retaining cord 12 is prepared with its two inserts 19, 20 and an additional length 27 protruding beyond the second insert 20. The retaining cord 12 is then inserted into the actuating member 2 by passing the additional length 27 through the first retaining orifice 14 and then through the second retaining orifice 16. The second insert 20 is thus passed through the first retaining orifice 14. The first insert 19 then abuts the edges of the first retaining orifice 14.

The actuating member 2 is then compressed by external maintenance or manufacturing means, for example by a ram. If the method concerns resetting an emergency opening device that is already mounted on an aircraft door, the actuating member 2 can be compressed by closing the door with the appropriate tools. The compression of the actuating member 2 causes the spring 11 to be compressed as far as the position of FIG. 1. The second insert 20 is thus passed through the second retaining orifice 16 by virtue of the guidance provided by the additional length 27 of the retaining cord 12.

Once the second insert 20 has passed through the second retaining orifice 16, the nut 21 is then placed on the second insert 20 and tightened until the retracted rest position illustrated in FIG. 1 is obtained. The additional length 27 is then sliced off at the second insert 20. As a variant, the additional length 27 is simply removably connected to the end of the retaining cord 12 on the side of the second insert 20, for example by an annulus.

FIG. 4 illustrates a variant for the second locking part 18. According to this variant, the fastener for locking the second insert 20 is a flange 28 that can be rotated about a shaft 29 and has a groove 30 with a width less than the diameter of the second insert 20. The placement of the nut 21 is thus advantageously replaced by rotating the flange 28 into a position in which it locks the second insert 20.

Variant embodiments of the emergency opening device may be implemented. The actuating member 2 may be a tubular member made up of more than two tubes nested one inside the other.

According to one variant, the actuating member 2 and the elastic compression means 11 may be formed of one and the same part. Such a part may have the shape of a flexurally stabilized tubular spring.

The triggering knife may be mounted at different locations than on the external tube 7, for example on the internal tube 6 or at any other location allowing transverse access to the retaining cord 12. As a variant, the triggering knife 22 may be formed by other sharp elements, such as scissors. The triggering knife 22 may also be remotely controlled by a cable rather than by a control lever 25.

The invention claimed is:

1. An emergency opening device for an aircraft door comprising:
    a tubular actuating member (2) having a first connecting end (3) and a second connecting end (4), the tubular actuating member (2) switches between a retracted rest position and a deployed open position;
    an elastic compression device (11) designed to urge the tubular actuating member (2) from the retracted rest position toward the deployed open position;
    a retaining member for retaining the tubular actuating member (2) in the retracted rest position with the elastic compression device (11) kept compressed;
    a triggering device designed to release the retaining member and cause the tubular actuating member (2) to transition into the deployed open position under the effect of the expansion of the elastic compression device (11);
    the retaining member has a retaining cord (12) which, when the tubular actuating member (2) is in the retracted rest position, is held taut between a first fastener (14, 17) at the first connecting end (3) and a second fastener (16, 18) at the second connecting end (4) of the tubular actuating member (2);
    the triggering device has a transversely-severing member (22) for transversely severing the retaining cord (12).

2. The emergency opening device as claimed in claim 1, wherein the first connecting end (3) has a first bottom wall (13) on which the first fastener (14, 17) is arranged, and the second connecting end (4) has a second bottom wall (15) on which the second fastener (16, 18) is arranged.

3. The emergency opening device as claimed in claim 2, wherein the first fastener (14, 17) has a first retaining orifice (14), made in the first bottom wall (13), in which is fitted a first end of the retaining cord (12), and the second fastener (16, 18) has a second retaining orifice (16), made in the second bottom wall (15), in which is fitted a second end of the retaining cord (12).

4. The emergency opening device as claimed in claim 3, wherein the first fastener (14, 17) comprises, at the first end of the retaining cord (12), a first part (17) for locking the retaining cord (12) in relation to the first retaining orifice (14), and the second fastener (16, 18) comprises, at the second end of the retaining cord (12), a second part (20, 21, 28) for locking the retaining cord (12) in relation to the second retaining orifice (16).

5. The emergency opening device as claimed in claim 4, wherein the first locking part (17) has a first insert (19) fastened to the retaining cord (12), and the second locking part (18) has a second insert (20) fastened to the retaining cord (12).

6. The emergency opening device as claimed in claim 5, wherein:
    the first insert (19) has a radial dimension greater than a radial dimension of the second insert (20);
    the first retaining orifice (14) has a diameter greater than the radial dimension of the second insert (20) and less than the radial dimension of the first insert (19);
    the second retaining orifice (16) has a diameter greater than the radial dimension of the second insert (20);

the second locking part (18) has a fastener (21, 28) for locking the second insert (20) in order to lock the second insert (20) in relation to the second retaining orifice (16).

7. The emergency opening device as claimed in claim 6, wherein the locking fastener is a rotatable flange (28) having a groove (30) for locking the second insert (20).

8. The emergency opening device as claimed in claim 1, wherein the retaining cord (12) is made up of a bundle of carbon fibers or aramid fibers.

9. The emergency opening device as claimed in claim 1, wherein the transverse-severing member (22) comprises a triggering knife extending in a cutting plane perpendicular to the retaining cord (12), the triggering knife being mounted so as to be able to pivot on the tubular actuating member (2), about a pivot (23) perpendicular to the cutting plane.

10. The emergency opening device as claimed in claim 9, wherein the transverse-severing member (22) has a control lever (25) projecting from the tubular actuating member (2) and designed to drive the transverse-severing member (22) against the retaining cord (12) by pivoting about the pivot (23).

11. The emergency opening device as claimed in claim 9, wherein the transverse-severing member (22) has a sharp edge (31) oriented to come into contact with the retaining cord (12) by way of a normal component and a tangential component.

12. The emergency opening device as claimed in claim 1, wherein the tubular actuating member (2) comprises coaxial cylinders (6, 7) that are nested in a slide connection, the elastic compression device (11) extending between two collars (9, 10), each of which is integral with a cylinder (6, 7).

13. The emergency opening device as claimed in claim 1, wherein the retaining cord (12) has a constant diameter.

14. An aircraft door comprising:
an emergency opening device as claimed in claim 1, the first connecting end (3) of which is in pivot connection with a movable element of the door, and the second connecting end (4) of which is in pivot connection with another movable element of the door, an action of moving said movable elements away from one another causing the door to open.

15. A method for resetting an emergency opening device as claimed in claim 6, the method comprising the steps of:
inserting the retaining cord (12), provided with an additional length (27) projecting from the second end, into the tubular actuating member (2) by inserting the second insert (20) through the first retaining orifice (14) and then through the second retaining orifice (16), until the first insert (19) locks the first end of the retaining cord (12) in relation to the first retaining orifice (14);
placing the fastener (21, 28) for locking the second insert (20) so as to lock the second end of the retaining cord (12) in relation to the second retaining orifice (16);
removing the additional length (27) of the retaining cord (12).

* * * * *